March 11, 1969  L. D. KLEISS  3,432,418
POLAROGRAPHIC ANALYZER

Filed July 19, 1965  Sheet 1 of 2

INVENTOR
L. D. KLEISS
BY
Young + Quigg
ATTORNEYS

INVENTOR
L. D. KLEISS
BY
*Young + Quigg*
ATTORNEYS

United States Patent Office 3,432,418
Patented Mar. 11, 1969

3,432,418
POLAROGRAPHIC ANALYZER
Louis D. Kleiss, Borger, Tex., assignor to Phillips Petroleum Company, a corporation of Delaware
Filed July 19, 1965, Ser. No. 472,797
U.S. Cl. 204—195
Int. Cl. B01k *3/00;* B01d *13/02*
16 Claims

ABSTRACT OF THE DISCLOSURE

Polarographic analyzers employing a floating input direct current operational amplifier grounded through a common tie point internally of the circuit of the analyzer, employing means such as a thermistor for compensating for large changes in the output signal caused by temperature sensitivity of the analyzer probe, and employing an analyzer probe of a structure wherein the sensor is supported in a casing by two supports which carry therebetween a sealing means for the casing.

---

This invention relates to a novel polarographic analyzer system. In one aspect this invention relates to a new and improved polarographic detector probe. Another aspect of this invention relates to a new and improved method and apparatus for compensating measurement errors of a polarographic analyzer caused by temperature changes of the fluid being analyzed.

Polarographic analyzers are adaptable to many uses in the scientific and industrial fields and can be employed, inter alia, to measure the oxygen in a liquid or gas, as well as to determine amounts of gases such as sulfur dioxide and carbon monoxide present in a material. Since such analyzers and their uses are generally well known in the art, the description of this invention will, for the sake of clarity, be limited to the measurement of oxygen in a fluid. However, it is to be understood that the invention itself is not so limited. Further details as to the construction, operation and theory of polarographic analyzers can be found in Analytical Chemistry, vol. 31, No. 1, pages 2 through 9, January 1959, and Bulletin 7015 of the Beckman Instruments, Inc., entitled, "A Dissolved Oxygen Primer" which disclosures are hereby incorporated herein by reference.

Briefly, polarographic analyzers comprise a detector probe the key component of which is the sensor which comprises an anode and cathode which are spaced apart but electrically connected by means of an electrolyte. The electrolyte is held in a thin, continuous film over and between the anode and cathode by a membrane which is permeable to the material in the process fluid which is to be sensed and measured. When oxygen is the material to be sensed a membrane such as polytetrafluoroethylene is employed and the amount of oxygen that passes through the membrane into the electrolyte is proportional to the partial pressure of the oxygen in the fluid or process stream to which the detector probe is exposed. The partial pressure of the oxygen is generally, although not strictly, representative of the amount of oxygen in the fluid. After the oxygen passes through the membrane it is reduced at the cathode and causes a current to flow through an external circuit to the anode, which current is substantially proportional to the partial pressure of the oxygen. Since the current is substantially proportional to the partial pressure of the oxygen present, it is also related to the concentration of oxygen in the fluid.

The probe is electrically connected to the second component of the analyzer which is an amplifier so that the current flowing from the sensor which is proportional to the partial pressure of oxygen passes from the sensor through the amplifier as the input thereof. The output of the amplifier is connected to suitable conventional well known recording means which include microammeters and/or other more permanent type recorders. It should be noted that when reference herein is made to an amplifier, such reference includes associated apparatus such as the anode bias supply, zero and span adjustment means, and the like.

Heretofore, certain analyzers have employed alternating current amplifiers which have the somewhat unique problem of some type of an alternating current signal, the cause of which is as yet not known to a certainty, being induced in the analyzer. Also, the alternating current amplifier is generally grounded, either purposely or by inductive coupling to a grounded chassis. Thus, if any one point of the sensor is grounded, accidentally or otherwise, erroneous measurements are obtained. For example, if the anode of a sensor used with an alternating current amplifier is grounded, the indicated oxygen measurement is typically increased by about 30 percent and if the cathode of the same sensor is grounded a microammeter used to indicate oxygen measurement will typically peg out at the high end of the scale. Similarly, some analyzers chop the input signal to the amplifier by periodically shorting it to ground. In the case of this type of analyzer, if the input circuit is additionally grounded elsewhere, such as at the sensor, a ground current will flow and measurement accuracy of the oxygen is again destroyed. Further, alternating current amplifiers besides being subject to both direct and capacitative grounding, require an alternating current power supply and therefore are not easily made portable.

It has now been found that by employing a floating input direct current operational amplifier in an analyzer the sensor can be grounded at any one point without causing erroneous oxygen measurement since the direct current amplifier is not subject to capacitative grounding and since a floating input direct current amplifier is electrically isolated both directly and inductively from electric conductors external of the analyzer. Furthermore, by the use of a direct current amplifier the power source can be electric batteries and therefore the analyzer is readily portable. It should be understood that the floating input amplifier of this invention is one which is not grounded externally of the amplifier but rather is insulated from external grounding. In other words, the amplifier of this invention is, in effect, grounded to the electrical circuit of the analyzer itself in that the ground of the analyzer of this invention is merely a common tie point which does not connect to the ground or other grounded articles such as the process piping outside of the amplifier case. This will be more readily seen by subsequent reference to FIGURE 1.

Also, some applications of the polarographic analyzer require that the sensor be inserted into a conduit carrying process fluid under pressure. It is desirable to construct the sensor as an elongated probe of small diameter so as to minimize difficulties of insertion and removal, and to simplify the construction of the packing gland through which the sensor is inserted. Prior art sensors of this general design have a plurality of sealing means (for example, O rings) and a cap which is screwed onto the tip of the sensor so as to compress said sealing means. One of these seals is located near the tip of the sensor, and performs the multiple function of holding the permeable membrane as a sac around the active portions of the anode and cathode and blocking process fluid from reaching the inner parts of the probe. If the process fluid reaches these inner parts, it may cause error by accidental grounding of metal parts, damage to electrical insulating material, and/or contamination of electrolyte via the relatively vulnerable inner seal of the neck of the sac which is formed by the membrane. A second seal is necessary to prevent the process fluid from reaching the inner parts of the sensor through the clearance in the screw threads by which the cap is secured and tightened. For most effective sealing, both seals should be compressed both axially and longitudinally. However, manufacturing tolerances of both sensors and sealing rings make this impractical. A compromise is employed, wherein one seal is compressed axially and the other longitudinally at some sacrifice of sealing reliability. The junction of the cap with the body of the probe forms a break or discontinuity, and the probe does not have a continuously smooth outer surface. When it is desired to insert a probe directly into a process stream which is carried in a pipe, it is generally necessary to pass the probe through a packing gland and straight bore valve before entry of the probe into the pipe itself and any discontinuity of the surface of the probe causes problems in this type of operation since the process fluid in the pipe is generally under an elevated pressure and it is difficult to prevent leakage of the process fluid through the straight bore valve and packing gland if the surface of the probe does not continuously and substantially completely fill the apertures of both the packing gland and the straight bore valve.

It has now been found that the interior of the probe behind the membrane covered part of the sensor and the membrane itself can both be sealed by a single sealing means internally of the probe so that the outer surface of the probe can be substantially continuously smooth and free of discontinuities. The probe of this invention employs a first support means carried by the sensor housing adjacent the sensor and interiorly of a casing member, and a second support means carried interiorly of and by said casing member which support means surrounds the sensor adjacent the open end of the casing through which process fluid is admitted to contact the membrane. A sealing means is carried about the periphery of the sensor intermediate of the two support means and the casing is supported on the sensor housing so that it can be moved longitudinally of the sensor. Thus, longitudinal movement of the casing in a direction toward the sensor and its housing causes abutment of both support means on substantially opposite sides of the sealing means thereby sealing the open end of the casing from the interior of that casing and sealing and holding the membrane which covers at least part, the exposed part, of the sensor.

Further heretofore, temperature sensitive resistance means such as thermistors have been used in amplifier feedback circuits with prior polarographic analyzers to compensate for the increased activity of sensors with increasing temperature. This increase in activity although not presently known to a certainty is probably due to the increasing permeability of the membrane. Prior analyzers thus correctly measure the partial pressure of the measured component over the compensated range. This is proportional to the molal concentration of gas mixtures, and these analyzers may be calibrated to read directly the molal concentration of constant pressure gas mixtures. However, in the case of measurement in liquid solution there is an additional factor caused by the influence of temperature on the solubility of the measured component in the liquid. Prior instruments measure partial pressure only, and require mathematical computation of the actual concentration of the measured component as outlined in Beckman Instruments, Inc., Bulletin 7015, previously referenced. Such an instrument, if used to directly measure a component in liquid solution, can be in error if the solution temperature changes.

Similar error-causing situations include those in which the process fluid is under an elevated pressure so that, for example, no vapor is formed when the temperature of the process fluid is increased and therefore oxygen does not leave the process fluid but rather remains therein. In such a case the amount of oxygen in the fluid remains substantially the same but the partial pressure of that oxygen remaining is also substantially increased. Since partial pressure is increased more oxygen will penetrate the membrane causing a larger current flow in the sensor which in turn will manifest on the recorder of the analyzer an indication of larger amounts of oxygen present and therefore be an erroneous oxygen measurement. This situation applied generally when the process fluid is passed through a pipe and oxygen measurements are desired to be made of the fluid in that pipe. Another situation of the type here under discussion is that which presents itself when the process fluid is under only atmospheric pressure but has an amount of oxygen present therein which is less than the amount that would be present under equilibrium conditions, i.e., the fluid is not saturated with oxygen. In this situation as the temperature of the fluid increases the partial pressure of the oxygen in that fluid will also increase up to the point at which the partial pressure of the oxygen in the fluid is substantially equal to the partial pressure of the oxygen in the atmosphere and the fluid is therefore saturated with oxygen. Thus, up to the point at which the fluid is saturated with oxygen a partial pressure of the oxygen in the fluid will be higher even though the amount of oxygen in the fluid is substantially the same. In this situation, as in the prior situation, it can be seen that erroneous oxygen measurements will be obtained.

It has now been found that the output current of the amplifier can be compensated for situations wherein the partial pressure of the oxygen in the process fluid varies although there is no substantial change in the amount of oxygen present in the process fluid by employing a resistance means which is operatively connected to the output of the amplifier and whose resistance varies as the temperature to which it is exposed changes in a manner such that the change of current output of the amplifier due to temperature change of the process fluid is compensated for by the change of resistance of the resistance means. Thus, there is provided a voltage output from the amplifier to the recorder that is compensated for measurement errors caused by temperature changes of the process fluid. The resistance means is, of course, exposed to the process fluid along with the sensor so that the same temperature changes in the process fluid act upon both the sensor and the resistance means. Thus, according to this aspect of the invention not only is the sensor compensated for due to temperature effects on its activity but also the amplifier output voltage to the recorder is compensated for temperature effects on the solubility of oxygen in the process fluid measured.

Accordingly, it is an object of this invention to provide a new and improved polarographic analyzer amplifier system. It is another object of this invention to provide a new and improved method and apparatus for compensating a polarographic analyzer for temperature effects on the solubility of oxygen in the process fluid. It is another object of this invention to provide a new and improved polarographic analyzer detector probe.

Other aspects, objects and advantages of the invention will be apparent to those skilled in the art from the description, the drawings and the appended claims.

Figure 1:
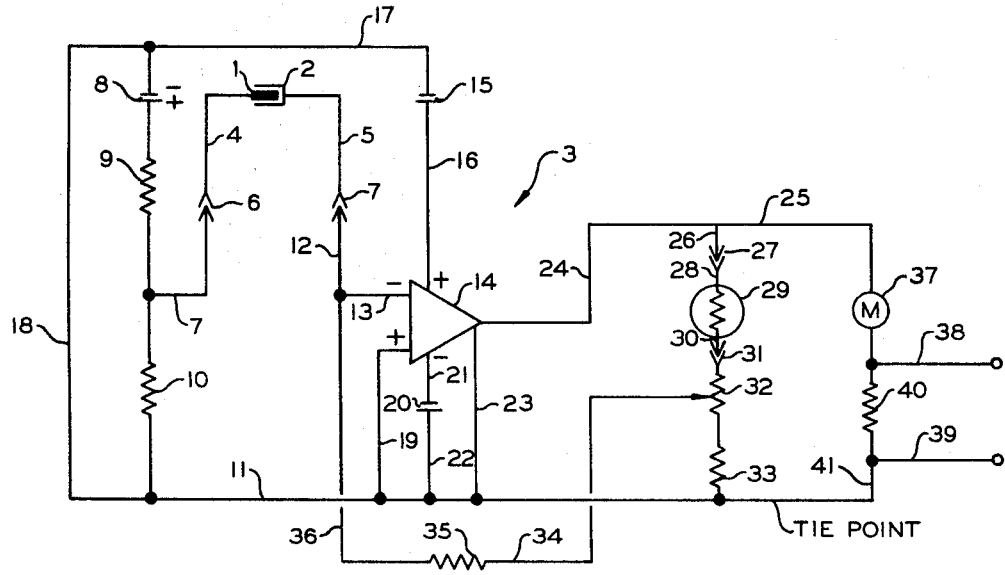
FIGURE 1 shows a circuit diagram embodying the floating input amplifier embodiment of this invention.

In FIGURE 1 there is shown an anode 1 which can be silver and a cathode 2 which can be gold and which represent the sensor of a probe. The sensor is electrically connected to the amplifier generally shown as 3 through leads 4 and 5 and terminal strip input connections 6 and 7. Anode 1 is biased in an amount of about 0.8 volt through lead 7 by means of battery 8. Battery 8 can be a 1.4 volt battery of any desired type but is preferably, as with the rest of the batteries employed in this circuit, a mercury battery since the voltage output of those batteries is relatively constant notwithstanding temperature changes and the age and degree of use of the battery. Battery 8 is connected through a 1.5 kilohm resistor 9, which gives a 0.6 volt drop thereacross to lead 7 and through a 2 kilohm resistor 10 which gives a 0.8 volt drop thereacross to common tie point or ground 11. Note that ground 11 is not connected to anything external of the circuit and therefore it is not directly or inductively grounded outside of the analyzer. When oxygen penetrates the polytetrafluoroethylene membrane or other similar oxygen permeable membranes well known in the art and therefore mixes with the electrolyte, which can be a potassium fluoride gel or other electrolyte also well known in the art, between anode 1 and cathode 2, electric current flows through leads 5, 12, and 13 into and as the input of the direct current amplifier 14 which is ungrounded externally of the analyzer.

Generally, any differential or floating input direct current operational amplifier can be employed as amplifier 14. A high gain (10,000 open loop voltage gain) electronic amplifier with a high input impedance, e.g., 200,000 ohms input impedance, can be employed. This particular type of amplifier does not reverse the phase of the input signal so that a positive input produces a positive output. A 16.8 volt battery or a series of batteries 15 is operatively connected through lead 16 to amplifier 14. Batteries 8 and 15 are operatively connected through leads 17 and 18 to ground 11. Similarly, lead 19 operatively connects an input of amplifier 14 with ground 11. A 16.8 volt battery or series of batteries 20 is operatively connected to amplifier 14 through 21 and to ground 11 through lead 22. The circuit ground of amplifier 14 is connected through lead 23 to 11. The voltage output of amplifier 14 passes through lead 24 to both leads 25 and 26.

Electrical current from lead 26 flows successively through terminal strip input connection 27, lead 28, thermistor 29, lead 30, terminal strip connection 31, 15 kiloohm potentiometer 32, and 9 kilohm resistor 33 to common ground 11. The wiper arm of potentiometer 32 is connected through lead 34, 3.63 megohm resistor 35, and lead 36 to input 13 of amplifier 14, thereby providing negative feedback which limits and defines the gain of amplifier 14. The measurement span of the analyzer is set by adjustment of potentiometer 32. The 3.63 megohm feedback resistor 35 is preferably employed for gaseous oxygen concentrations of 0 to 5 volume percent. Other feedback resistors can be employed in parallel with resistor 35 for other oxygen concentration ranges. For example, a 909 kilohm resistor can be employed in parallel with resistor 35 to provide a 0 to 25 volume percent oxygen range.

Lead 25 is connected to a suitable ammeter 37, such as a microammeter, preferably having a range of 0 to 100 microamperes, for direct and temporary "readout" of either the partial pressure of the oxygen or the concentration of the oxygen present depending upon the manner in which the analyzer was originally calibrated. Calibration of the analyzer for either partial pressure or concentration "readout" is known in the art and therefore will not be further discussed here. The output current from amplifier 14 can also be recorded in a more permanent form by connecting any suitable recorder known in the art to leads 38 and 39 which are connected across a 30 kilohm resistor 40 which in turn is connected to ground 11 through conduit 41.

Thermistor 29 is conventionally employed in the detector probe itself so that it is subjected to the same temperature changes as the probe and therefore compensates for large changes in the output signal of the sensor in the probe caused by temperature sensitivity of the probe. A suitable thermistor will have a resistance at 25° C. of about 50,000 ohms and a negative temperature coefficient of about 4.7 percent per degree centigrade. The use of such thermistors to compensate for temperature effects on the activity of the sensor itself is well known in the polarographic art and therefore will not be further discussed.

Figure 2:
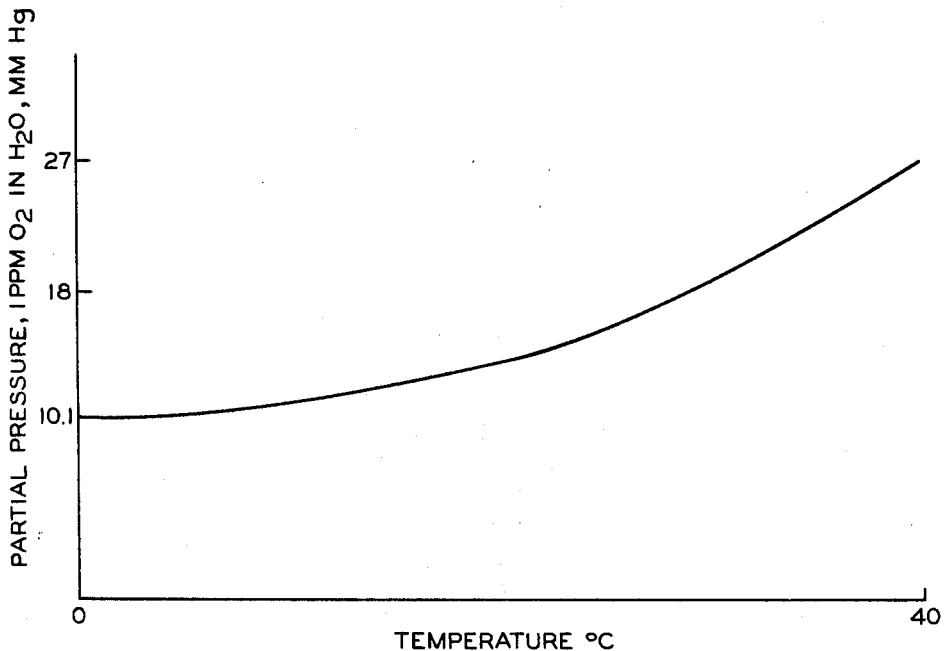
FIGURE 2 shows graphically the relationship of the partial pressure of one part per million oxygen (1 milligram per liter) in water as it varies in temperature.

FIGURE 2 shows that with a given concentration, 1 part per million, of oxygen dissolved in a liquid, the partial pressure of this fixed amount of oxygen will increase and decrease in a nonlinear manner with increasing and decreasing temperature. One aspect of this invention employs a compensator resistor or resistors whose resistance or resistances decrease in inverse proportion as the partial pressure of the substantially fixed amount of dissolved oxygen increases due to temperature increases and vice versa. The resistance change of the compensator resistor of this invention is deliberately nonlinear to inversely match the nonlinear change in partial pressure of the dissolved oxygen, so that the product of partial pressure and resistance is substantially always a constant for a constant amount of dissolved oxygen regardless of the temperature of the liquid in which the oxygen is dissolved.

When a negative temperature coefficient thermistor is used to compensate the effect of variable component solubility in a liquid, multiplication is done electrically according to Ohm's law, $E=IR$. The output of an operational amplifier is a voltage, and this produces a current I when grounded through a circuit of essentially constant resistance. A minor part of the resistance in this circuit is comprised by a negative temperature coefficient thermistor exposed to the temperature of the process liquid, and having a resistance R. The IR drop across the thermistor is a voltage E. This voltage represents the partial pressure of, for example, oxygen in the solution multiplied by the reciprocal of partial pressure of 1 p.p.m. $O_2$ at the process temperature.

(1)

$$E = IR = K_1 \times \text{partial pressure of } O_2$$
$$\times \frac{1}{K_2 \times \text{partial pressure of 1 p.p.m. } O_2}$$
$$= K_3 \times \text{p.p.m. } O_2 \text{ in process liquid}$$

where $K_1$, $K_2$, and $K_3$ are constants.

It can be seen that if the current output of the amplifier increases due to an increase in temperature of the liquid in which the oxygen is dissolved, the thermistor, which is exposed to the same liquid and therefore the same temperature acting upon the sensor of the analyzer, decreases its resistance since this thermistor has a negative temperature coefficient of resistance. Thus, when the current flow increases due to an increase in temperature the resistance of the thermistor goes down due to the same increase in temperature. Thus, when the decrease in resistance of the thermistor is matched against the increase in current output of the analyzer amplifier the voltage which is passed to a recording device remains the same notwithstanding the fact that the partial pressure of the oxygen has in fact increased. Therefore, the voltage output E is temperature compensated and allows for direct "readout" of parts per million of oxygen dissolved in the liquid notwithstanding the fact that the liquid itself continuously varies in temperature.

Figures 3, 4:
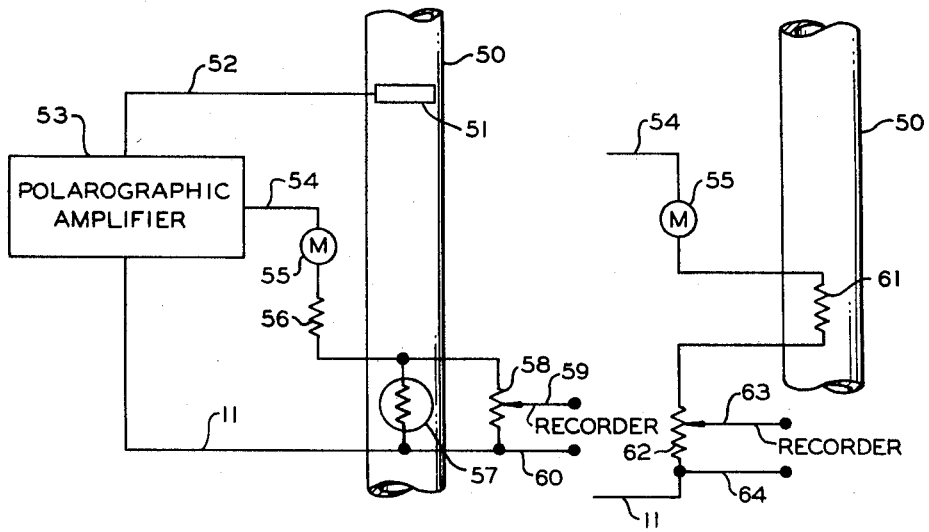
FIGURE 3 and FIGURE 4 show diagrammatically a system embodying the compensator for temperature effects of solubility on oxygen according to this invention.

A present preferred version of this method for compensation of component solubility in the liquid is shown in FIGURE 3. A pipe 50 carries a process liquid, the oxygen content of which is to be measured by polarographic detector probe 51 which is operatively connected through conduit 52 to amplifier 53. Detector probe 51 and amplifier 53 schematically represent any temperature compensated polarographic measurement probe coupled with a compatible amplifier and bias voltage supply. Detector probe 51 and amplifier 53 may jointly comprise the elements numbered 1 through 36 in FIGURE 1, but are not limited thereto. Current from amplifier 53 flows through lead 54, through microammeter 55, through resistor 56, and then through thermistor 57 and potentiometer 58, which are arranged in parallel configuration, to amplifier ground 11. The current which flows from lead 54 to ground 11 is substantially proportional to the output voltage of amplifier 53. Resistor 56 has a fixed resistance preferably ten or more times the resistance of thermistor 57. Thermistor 57 is exposed to the process liquid temperature. It has a negative temperature coefficient of resistance whose percentage change per degree of temperature change roughly matches the positive percentage change in partial pressure of measured component per degree of temperature. An example of this latter change is shown in FIGURE 2. Most thermistors currently available have a greater negative resistance change with increasing temperature than is desirable for this invention, and this negative resistance change may be reduced by a fixed resistance shunt around the thermistor. A shunt around thermistor 57 is provided by potentiometer 58. The resistance of potentiometer 58 is chosen so that it shunts and trims the negative resistance coefficient of thermistor 57 to the exact desired value in the temperature range of interest. A second function of potentiometer 58 is that it may be adjusted to pick off any portion of the IR voltage drop across thermistor 57, thereby compensating the constant gain factor $K_3$ in Equation 1 above. The voltage which appears across leads 59 and 60 may be fed to a high impedance recorder for an indication of a permanent record of measured component concentration.

In one method of using the apparatus of FIGURE 3, the sensor is calibrated in air. The partial pressure of oxygen in air is roughly 159 mm. of mercury at sea level. The negative feedback of the amplifier is adjusted using, for instance, a potentiometer similar to that shown as potentiometer 32 in FIGURE 1, so that the voltage output of the amplifier and thus the deflection of microammeter 55 indicates some fixed value corresponding to 159 mm. This calibration should be repeated when the sensor is changed by cleaning, rejuvenation, or after long use. This calibration nulls out the effects of variable diaphragm thickness and permeability, electrolyte concentration and contamination, and metal surface fouling. It should be noted that the above feedback circuit contains a thermistor exposed to the temperature of the probe which compensates for the temperature sensitivity of the probe so that calibration in air can be performed at any temperature within a specified range. The calibrated sensor is then inserted in the process liquid. If the characteristics of thermistor 57 are accurately known and if an accurate partial pressure vs. concentration plot similar to FIGURE 2 is available, the correct setting of potentiometer 57 can be calculated to give, say, a 50 millivolt full scale deflection for 10 p.p.m. by weight of oxygen in water. Alternately, a sample of the process liquid can be analyzed for p.p.m. $O_2$ in solution, by the Winkler or other laboratory method, and potentiometer 58 adjusted so that the recorder indicates the correct value of p.p.m. oxygen in liquid. Once potentiometer 58 is adjusted it need not be changed again unless the process liquid changes. It should be emphasized that two separate negative temperature coefficient thermistors are used, each in a separate circuit and for a separate compensation. One thermistor is shown in the prior art, and is in series with the negative feedback current path of the amplifier. It compensates for the increased activity of the sensor with increasing temperature, and has a relatively large influence on the current flowing in the feedback path. The thermistor which is novel in my invention is a non-linear analog multiplication device. It is in the output circuit of the amplifier, it has an insignificant effect on current flow, and it has a non-linear change in resistance vs. temperature which is the deliberate inverse of the change in partial pressure of a constant amount of oxygen versus the same temperatures.

It has been determined in the development of this invention that the partial pressure of oxygen dissolved in water increases by about 1.6 percent for each degree centigrade of temperature rise. It has also been determined that the resistance of thermistors decreases with temperature rise on the order of from about 3 to about 5 percent per degree centigrade. Thus, in general, it is preferred in practicing this invention to combine a thermistor in parallel with a temperature stable resistor so that the negative resistance change of the thermistor resistor network substantially exactly matches the increase in partial pressure of oxygen dissolved in water, each with respect to temperature.

In carrying out this aspect of the invention the partial pressure of 1 part per million of oxygen in water was calculated for three or more temperatures in the process temperature range of interest. This is shown in FIGURE 2. These calculated partial pressures were divided by the partial pressure at the middle of the temperature range to obtain partial pressure ratio with respect to the middle temperature. The log of these ratios were plotted against temperature using semilog paper. These ratios increased about 1.6 percent per degree C., depending upon the temperature range.

A thermistor was selected whose physical dimensions permitted encapsulation in the probe to be immersed in the process fluid. The resistance of the thermistor was from about 1.5 to about 2 kilohms in the temperature range of interest. The thermistors employed in this invention should be selected so that the negative temperature coefficient of resistance is as low as possible, i.e., about 3 percent per degree C. The resistance of the thermistor was measured at several temperatures in the process range, including the middle temperature mentioned above. In the thermistor-resistor network shown in FIGURE 3 a value of R for each temperature was calculated so that:

$$(2) \quad \frac{\text{network resistance at middle temperature}}{\text{network resistance at calculated temperature}} = \frac{\text{oxygen partial pressure at calculated temperature}}{\text{oxygen partial pressure at middle temperature}}$$

The ratio of oxygen partial pressures can be read from the graph mentioned above. An average of the R's for the potentiometer 58 thus calculated is selected and used as the thermistor shunt as shown in FIGURE 3. If all or part of potentiometer 58 is the winding of a potentiometer the voltage output of the analyzer, being adjustable for span, can be made to read directly in parts per million on a standard chart, using a standard voltage recorder.

The accuracy of this method of compensation for variable solubility of oxygen in water due to temperature change can be computed by recomputing the left half of Equation 2 using the average value of R selected, and plotting the ratios thus computed on the same plot with the semilog plot of partial pressure ratios mentioned above.

In a specific embodiment of this invention a disk thermistor can be employed, the thermistor having a resistance of 1.4 kilohms at a middle temperature of 25° C. and a negative temperature coefficient of about 4.1 percent per degree C. The thermistor was shunted by a 1 kilohm potentiometer in the manner shown in FIGURE 3 and the calculated error of this solubility compensation was about 1 percent of reading over a 10° C. process fluid temperature span, and about 4 percent of reading over a 20° C. process fluid temperature span.

The process fluid employed in this example was water containing about 6 p.p.m. by weight of oxygen and the temperature of the water was varied from about 7 to about 31° C. A polarographic analyzer with a polarographic oxygen sensor was used. This analyzer is described in Beckman Instructions 1224, the disclosure of which is hereby incorporated herein by reference. Referring to FIGURE 11 of these instructions, resistor R31 was removed and the parallel combination of a thermistor as described in the next preceding paragraph and a 1K potentiometer were wired into its place.

An alternate method of compensating the output signal of a polarographic analyzer for temperature induced changes in the partial pressure of the measured component in the process liquid is shown in FIGURE 4. FIGURE 4 shows the same pipe 50 as shown in FIGURE 3. Lead 54 carries the voltage output of a polarographic analyzer amplifier, said voltage being proportional to the partial pressure of oxygen dissolved in the liquid carried by pipe 50. A positive temperature coefficient thermistor 61 is exposed to the temperature of the liquid. Microammeter 55, thermistor 61, and resistor 62 in series comprise a network restricting the flow of current from lead 54 to amplifier ground 11. The resistance values of these elements and the resistance vs. temperature characteristics of the thermistor are chosen so that the network resistance increases percentagewise as the partial pressure of oxygen in solution increases percentagewise, assuming increasing liquid temperature and a fixed amount of oxygen in solution. To achieve this non-linear curve fit, it may be necessary to add shunt and series fixed resistors to thermistor 61, and thus achieve the desired resistance versus temperature characteristic for the network. This method of modifying thermistor characteristics is well known to those versed in the art. In this method of compensation for temperature induced partial pressure changes of a component dissolved in a liquid, current is the output variable, and is obtained by division, according to Ohm's law:

(3)
$$I = E/R = \frac{\text{amplifier output voltage}}{\text{network resistance}}$$
$$= \frac{K_4 \times \text{partial pressure of } O_2 \text{ in solution at temperature } t}{K_5 \times \text{partial pressure of 1 p.p.m. } O_2 \text{ at temperature } t}$$
$$= K_6 \times \text{p.p.m. } O_2 \text{ in liquid}$$

where $K_4$, $K_5$, and $K_6$ are constants.

Current flow in the network is measured by measuring the IR drop across resistor 62 in FIGURE 4. If resistor 62 is in the form of the winding of a potentiometer, as shown, the EMF from leads 63 and 64 is adjustable for calibration purposes. A conventional, suitably high impedance recorder, not shown, can be connected to leads 63 and 64 for indicating and recording the p.p.m. oxygen of the process liquid.

Figure 5:
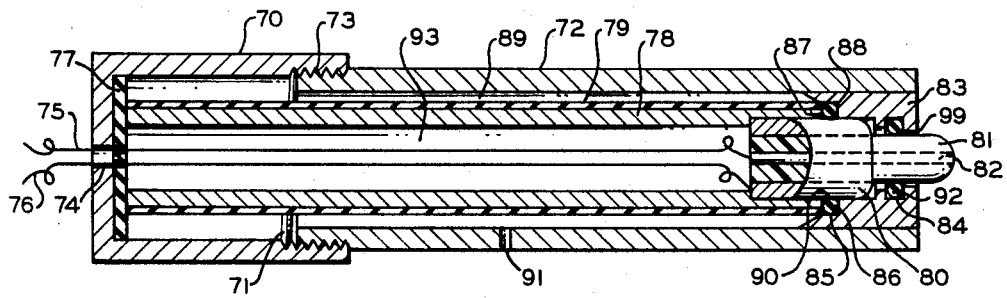
FIGURES 5 and 6 show probes embodying the single seal aspect of this invention.

In FIGURE 5 there is shown a detector probe comprising a housing 70 internally threaded at 71 to accept casing 72 which is externally threaded at 73. The closed end of housing 70 has aperture 74 therein for admitting electrical leads 75 and 76 to the interior thereof. A sealing and insulating washer 77 fits internally of housing 70 and seals off aperture 74 while still admitting leads 75 and 76. This seal can be any type of electrical insulator such as a rubber. A hollow inner member 78 abuts washer 77 at the closed end of housing 70 centering aperture 74 and carries about its outer surface insulating member 79 which can be composed of the same material as washer 77.

Anode 80 is fixed to the end of hollow member 78 about electrical insulating spacer 81. Cathode 82 passes through the interior of anode 80 and spacer 81 and is thus spaced from and electrically insulated from anode 80 until the two are electrically joined by an electrolyte film. In the unthreaded end of casing 72 is a support member 83 having support notches 84 and 85. In notch 84 there is an O-ring 92 which acts as a spacer for maintaining spacer 81 in a central position of the opening 99 defined by support means 83. In notch 85 there is a single sealing means 86 for the entire detector probe. The sealing means, hereinafter referred to as an O-ring, is thus disposed between end 87 of support 78 and face 88 of support 83 so that when casing 72 is moved longitudinally of the anode and cathode, hereinafter referred to as the sensor, O-ring 86 is squeezed between supports 78 and 83 thereby sealing open end 99 of the probe from the annular interior 89 of the remainder of the probe. Thus, process fluid which must come in contact with the membrane covering spacer 81 cannot penetrate further into the probe than O-ring 86. An annular notch 90 about the periphery of anode 80 provides a receiving means for the membrane thereby allowing O-ring 86 to not only seal off the interior 89 of casing 72 but also to hold and seal the membrane (not shown) over spacer 81 and at least part of cathode 82 and anode 80. Lead 75 is connected to cathode 82 and lead 76 is connected to anode 80 so that electrical current can be passed from the sensor means out of the probe to the amplifier. To vent any accidental leakage of process fluid, weep holes 91 are provided in casing 72. Support means 83 can be either metal or, more preferably, plastic, e.g., polytetrafluoroethylene or polychlorotrifluoroethylene and the like. Spacer 92 and O-ring 86 can be formed of any resilient material which is inert to the process fluid and softer than the material from which the membrane is formed in order to prevent cutting of the membrane. Generally, any solvent resisting rubber can be employed, for example a copolymer of hexafluoropropylene and vinylidene fluoride.

The sensor of the probe including the anode and cathode can be formed of components and in the manner disclosed by U.S. Patent 2,913,386 the disclosure of which is hereby incorporated herein by reference Also, in hollow space 93 behind anode 80 and internally of member 78 one or more thermistors and associated or similar apparatus can be employed so that the thermistors will be exposed to the temperatures of the process fluid to which the probe and its sensor are exposed.

In a preferred embodiment casing 72 is made sufficiently long, slender and smooth on its external surface so that it can be inserted into a process stream under pressures of as high as 130 p.s.i.a. and higher through a slidable packing gland and a straight bore valve means. A particular advantage of this embodiment is that by being able to expose the probe to the process fluid in this manner, external sampling systems whereby a sample of the process fluid is removed from its container are eliminated and the expense and problems of such systems are eliminated therewith. The simple single seal aspect of this invention prevents contamination of the active portions of the probe by process fluid, and electrical shorting by electrical conductive process fluid.

The cross sectional configuration of the housing, casing, support members and the like can be round, square and the like, but is preferably round.

Figure 6:
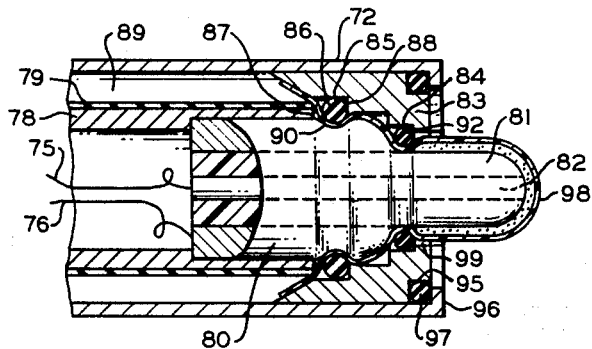

In FIGURE 6 there is shown a modification of the probe of FIGURE 5 in that a notch 95 is provide around the outer periphery of the support 83 and a flange 96 is employed extending interiorly from casing 72 over notch 95. There is contained between the sides of notch 95 and the flange and internal side of casing 72 an O-ring 97 which acts as a seal means to prevent admission of process fluid to annular space 89. Seal ring 97 is employed when it is either not desired or not feasible to seal support means 83 to casing 72. Thus, in this embodiment of the invention support means 83 is not attached to casing 72 but rather freely slidable therein although closely fitting with casing 72 to provide a maximum sealing in conjunction with O-ring 97. O-ring 97 can be made from the same material from which O-ring 86 is made.

There is also shown in FIGURE 6 membrane 98 as it would appear in place covering spacer 81 and part of anode 80 and being sealed to and held on anode 80 by O-ring 86 acting against membrane 98 in grooves 90. It should be noted that spacer 92 is not a seal but rather is employed to squeeze the electrolyte into an intimate, continuous contact with anode 80 and cathode 82 to provide electrical contact between those two electrodes.

Reasonable variations and modifications are possible within the scope of this disclosure without departing from the spirit and scope thereof.

I claim:

1. In a polarographic analyzer wherein a sensor means which includes an anode, cathode, and a permeable membrane is exposed to a material and produces a current in proportion to the partial pressure of a substanue in that material which can penetrate said membrane, the sensor means is operatively connected to the input of a current amplifier so that the current produced by the sensor is employed as the input current to said amplifier, and the output of said amplifier is operatively connected to a registering device so that the output of said amplifier is registered; the improvement comprising employing as the current amplifier a floating input direct current operational amplifier which is grounded through a common tie point internally of the circuit of the analyzer and thereby insulated from grounding externally of said analyzer so that grounding of the sensor means at any one point does not cause erroneous amplifier output registration.

2. In a polarographic analyzer wherein a sensor means which includes an anode, cathode, and a permeable membrane is exposed to a fluid and produces a current in proportion to the partial pressure of at least one material in said fluid which can penetrate said membrane, the sensor means is operatively connected to the input of a current amplifier so that the current produced by the sensor is employed as the input current to said amplifier, and the output of said amplifier is operatively connected to a current registering device so that the current produced by said amplifier is registered on said device thereby visually indicating the partial pressure of said component; the improvement comprising employing as the current amplifier a direct current operational amplifier which is grounded through a common tie point internally of the circuit of the analyzer and thereby insulated from grounding externally of said analyzer so that the amplifier is electrically isolated both directly and inductively from electrical conductors external of the analyzer and grounding of the sensor at any one point does not cause erroneous current registration.

3. In a polarographic oxygen analyzer wherein a sensor means comprising spaced apart cathode and anode means electrically connected by an electrolyte which is contained in an oxygen permeable membrane is exposed to a fluid and produces a current in proportion to the partial pressure of the oxygen in the fluid as the oxygen penetrates the membrane and mixes with said electrolyte, the sensor means is electrically connected to the input of a current amplifier so that the current produced by the sensor means is employed as the input current to said amplifier, and the output of said amplifier is operatively connected to a current registering device so that the current produced by said amplifier is registered on said device thereby manifesting the partial pressure of the oxygen in said fluid; the improvement comprising employing as the current amplifier a floating input direct current operational amplifier which is grounded through a common tie point internally of the circuit of the analyzer and thereby insulated from grounding externally of said analyzer so that grounding of the sensor means at any one point including lead-in wires to the anode or cathode does not cause erroneous current registration.

4. In a polarographic analyzer wherein a sensor means which includes an anode, cathode, and a permeable membrane is exposed to a liquid and produces a current in proportion to the partial pressure of a substance in that liquid that penetrates said membrane, the sensor means is operatively connected to the input of a current amplifier so that the current produced by the sensor means is employed as the input current to said amplifier, and the output of said amplifier is operatively connected to a recording device; the improvement comprising a compensator resistor means operatively connected to the output of said amplifier, the resistance of said compensator resistor varying as the temperature to which it is exposed changes and in a manner such that the change of voltage output of the amplifier due to temperature change of the liquid to which said sensor means is exposed is compensated for by the change of resistance of said compensator resistor means thereby providing a voltage output from said amplifier that is compensated for measurement errors caused by temperature changes of said liquid, said compensator resistor means being in temperature equilibrium with the liquid said sensor is exposed to.

5. In an analyzer composed of a polarographic sensor which includes an anode, cathode, and a permeable membrane and an amplifier, said amplifier producing an output voltage proportional to the partial pressure of one or more components which penetrate said membrane and which are dissolved in a liquid which is in contact with said sensor, the improvement comprising a substantially constant resistance circuit connected to the output of said amplifier containing therein a negative temperature coefficient thermistor maintained in temperature equilibrium with said liquid, said thermistor having a resistance which varies with temperature in inverse proportion as the partial pressure of said components varies with temperature of said liquid, the voltage appearing across said thermistor being measurable as a measure of said component concentration in said liquid.

6. The apparatus according to claim 5 wherein said thermistor is shunted by an adjustable potentiometer for the dual purpose of modifying the resistance versus temperature characteristic of said thermistor and providing means for attenuating the output voltage appearing across said thermistor.

7. In an analyzer composed of a polarographic sensor which includes an anode, cathode, and a permeable membrane and an amplifier, said amplifier producing an output voltage proportional to the partial pressure of at least one component which penetrates said membrane and which is dissolved in a liquid which is in contact with said sensor, the improvement comprising a variable resistance circuit connected to the output of said amplifier, the resistance of said circuit being responsive to the temperature of said liquid in a manner such that any temperature change in said liquid will influence the resistance of said circuit in proportion to its influence on the partial pressure of said at least one component dissolved in said liquid, the resultant current flowing in said circuit being measurable as an indicia of component concentration.

8. The apparatus according to claim 7 wherein a portion of said circuit is composed of a positive temperature coefficient thermistor in temperature equilibrium with said liquid.

9. In a polarographic analyzer wherein a sensor means which includes an anode, cathode, and a permeable membrane is exposed to a liquid and produces a current in proportion to the partial pressure of a component of said liquid that penetrates said membrane, the sensor means is operatively connected to the input of a current amplifier so that the current produced by the sensor means is employed as the input to said amplifier, and the output of said amplifier is operatively connected to a recording means; the improvement comprising a thermistor operatively connected to the output of said amplifier intermediate said amplifier and said recording means, means for varying the slope of the temperature versus resistance curve of the said thermistor which is operatively connected to said thermistor to produce a network whose resistance varies with the temperature to which it is exposed in a manner such that the proportional change of current output of the amplifier due to temperature change of the fluid to which said sensor means is exposed is compensated for thereby providing a voltage output from said amplifier into said recording means that is compensated for partial pressure variations caused by temperature changes of said liquid, said network being in temperature equilibrium with the fluid to which said sensor means is exposed.

10. The apparatus according to claim 9 wherein said network comprises a thermistor and at least one resistor in parallel with said thermistor.

11. In a polarographic oxygen analyzer wherein a sensor means including an anode and a spaced apart cathode are electrically connected by an electrolyte held by an oxygen permeable membrane produces a current in proportion to the partial pressure of the oxygen in a liquid as oxygen penetrates said membrane into said electrolyte, the sensor means is operatively connected to the input of a current amplifier so that the current produced by the sensor is employed as the input current to said amplifier, and the output of said amplifier is operatively connected to a recording device; the improvement comprising a thermistor operatively connected to the output of said amplifier between said amplifier and said recording device, said thermistor being adapted so that its resistance varies as the temperature to which it is exposed changes in a manner such that the change of current output of the amplifier caused by temperature change effecting a change in the amount of oxygen that penetrates the membrane is compensated for by the change of resistance of said thermistor thereby providing a voltage output to said recording device that is compensated for measurement errors caused by temperature changes effecting a change in the amount of oxygen that permeates the membrane notwithstanding the fact that substantially the same amount of oxygen is present, said thermistor being in temperature equilibrium with the same liquid to which said sensor is exposed.

12. The apparatus according to claim 11 wherein said thermistor has its temperature versus resistance curve slope modified by at least one fixed resistor connected in parallel with said thermistor.

13. In a polarographic oxygen analyzer wherein a sensor means comprising spaced apart cathode and anode means electrically connected by an electrolyte which is contained in an oxygen permeable membrane is exposed to a fluid and produces a current in proportion to the partial pressure of the oxygen in the fluid as the oxygen penetrates the membrane and mixes with said electrolyte, the sensor means is electrically connected to the input of a current amplifier so that the current produced by the sensor means is employed as the input current to said amplifier, and the output of said amplifier is operatively connected to a current registering device so that the current produced by said amplifier is registered on said device thereby manifesting the partial pressure of the oxygen in said fluid; the improvement comprising employing as the current amplifier a floating input direct current operational amplifier grounded through a common tie point internally of the circuit of the analyzer and thereby insulated from grounding externally of said analyzer so that grounding of the sensor means at any one point including lead-in wires to the anode or cathode does not cause erroneous current registration and a thermistor which is operatively connected to the output of said amplifier intermediate said amplifier and said registering device, the resistance of which thermistor varies as the temperature to which it is exposed changes in a manner such that the change of current output of said amplifier due to temperature change of said fluid to which said sensor means is exposed is compensated for by the change in resistance of said thermistor thereby providing a voltage output from said amplifier to said registering device that is compensated for measurement errors caused by temperature changes of said fluid, said thermistor being exposed to the same fluid to which said sensor means is exposed.

14. In a polarographic detector probe wherein the sensor means including an anode and cathode in one end thereof is housed in an open ended casing capable of being moved longitudinally of said sensor means, said anode and cathode being adjacent to the open end of said casing and being covered by a permeable membrane which holds electrolyte between itself and said anode and cathode; the improvement comprising a first tubular support means that extends from the rear of said casing to said sensor without contact along its length with said casing, said first support being carried by said sensor means near said anode and cathode, and a second support means carried substantially completely interiorly of and by said casing adjacent the open end of same, a sealing means carried about the periphery of said sensor means intermediate the two support means, the movement of said open end of said casing in a direction toward said detector means causes abutting of both said support means on said sealing device thereby sealing open end of said casing on the interior of same, said sealing means being positioned sufficiently close to said anode and cathode to also act as the holding and sealing means for the membrane which covers at least part of said anode and cathode, and a spacer means carried about the periphery of said sensor near said anode and cathode and in pressing contact with said membrane to squeeze said electrolyte into intimate contact with said anode and cathode.

15. In a polarographic detector probe wherein the sensor means including an anode and cathode at one end thereof is housed in an open ended casing capable of being moved longitudinally of said sensor means, said anode and cathode being adjacent to the open end of said casing and being covered by a permeable membrane which holds electrolyte between itself and said anode and cathode; the improvement comprising a first support means carried by said sensor means near said anode and cathode, a flange means extending inwardly from the open end of said casing and defining a central aperture in said open end of said casing, a second support means slidably carried interiorly of said casing against said flange, said second support means carrying a sealing means for sealing the junction between said support means and the interior wall of said casing, and a sealing means carried about the periphery of said sensing means intermediate the two support means so that movement of said open end of said casing in a direction toward said sensor means causes movement of said second support toward said sealing means carried about the periphery of said sensor means and thereby causes abutting of both said support means on said sealing means thereby sealing the open end of said casing from the interior of same, said sealing means carried about the periphery of said sensor means being positioned sufficiently close to said anode and cathode to also act as the holding and sealing means for the membrane which covers at least part of said anode and cathode, and a spacer means carried about the periphery of said sensor near said anode and cathode and in pressing contact with said membrane to squeeze said electrolyte into intimate contact with said anode and cathode.

16. In a polarographic detector probe wherein the sensor means including an anode and a cathode at one end thereof is housed in a tubular, open ended, non-flanged casing which can be moved longitudinally of said sensor means, said anode and cathode being adjacent to said open end of said casing and being covered by a permeable membrane; the improvement comprising a first tubular support means that extends from the rear of said casing to said sensor without contact along its length with said casing, said first support being carried by said sensor means adjacent to said anode and cathode, a second support means carried substantially completely interiorly of and by said casing adjacent the open end of said casing and spaced apart from said first support means, and a resilient O-ring sealing means carried in a groove about the periphery of said sensing means in the face intermediate the two support means and abutting said first support means on one side thereof so that movement of said second support means in a direction toward said sensor means causes abutting of both said support means on opposite sides of said O-ring thereby sealing the open end of said casing from the interior of same, said O-ring being positioned sufficiently close to the end of said anode and cathode to also act as the holding and sealing means for the membrane when it covers the end of said anode and cathode and extends betwen the interior surface of said O-ring and the groove in said sensor means in which said O-ring is carried.

References Cited

UNITED STATES PATENTS

| | | | |
|---|---|---|---|
| 3,098,813 | 7/1963 | Beebe et al. | 204—195 |
| 3,235,477 | 2/1966 | Keyser et al. | 204—195 |
| 3,239,444 | 3/1966 | Heldenbrand | 204—195 |
| 3,297,943 | 1/1967 | Morgan et al. | 204—195 |
| 3,322,662 | 5/1967 | Mackereth | 204—195 |
| 3,334,623 | 8/1967 | Hillier et al. | 204—195 |

JOHN H. MACK, *Primary Examiner.*

T. TUNG, *Assistant Examiner.*

U.S. Cl. X.R.

204—1; 324—29